United States Patent [19]
Nishinosono et al.

[11] Patent Number: 5,897,098
[45] Date of Patent: Apr. 27, 1999

[54] SOLENOID VALVE FOR AUTOMATIC TRANSMISSION CONTROL SYSTEM

[75] Inventors: Hiroyuki Nishinosono; Nobuyuki Oka, both of Fujisawa, Japan

[73] Assignee: NOK Corporation, Tokyo, Japan

[21] Appl. No.: 08/884,221

[22] Filed: Jun. 27, 1997

[30] Foreign Application Priority Data

| Jun. 28, 1996 | [JP] | Japan | 8-188637 |
| Dec. 6, 1996 | [JP] | Japan | 8-342801 |
| Feb. 7, 1997 | [JP] | Japan | 9-039935 |

[51] Int. Cl.$^6$ .................................................. F16K 31/02
[52] U.S. Cl. .............................. 251/129.08; 251/129.21; 251/205
[58] Field of Search .................... 251/129.08, 129.15, 251/129.21, 205

[56] References Cited

U.S. PATENT DOCUMENTS

| 1,833,030 | 11/1931 | Kenworthy | 251/205 |
| 4,193,421 | 3/1980 | Sakakibara et al. | 251/129.08 |
| 4,437,645 | 3/1984 | Nomura et al. | 251/129.21 |
| 4,504,039 | 3/1985 | Akagi | 251/129.21 |
| 4,512,546 | 4/1985 | Inada et al. | 251/129.08 |
| 4,535,815 | 8/1985 | Ohumi et al. | 251/129.21 |
| 5,199,648 | 4/1993 | Fujikawa | 251/129.21 |
| 5,533,707 | 7/1996 | Beesley | 251/129.15 |

FOREIGN PATENT DOCUMENTS

| 239880 | 10/1991 | Japan | 251/129.15 |
| 206963 | 12/1967 | U.S.S.R. | 251/129.15 |

*Primary Examiner*—Denise L. Ferensic
*Assistant Examiner*—John Ball
*Attorney, Agent, or Firm*—Jacobson, Price, Holman & Stern, PLLC

[57] ABSTRACT

A solenoid valve (10) for use in an electronic shift control system of an automotive automatic transmission. The solenoid valve includes a body (12) having a cylindrical chamber (34) in which a movable armature (34) is slidably received and which is in communication with an inlet (96) for the automatic transmission fluid and an outlet (104). The body defines a cylindrical valve seat (88) in which a cylindrical valve member (90) coupled to the armature is slidably fitted. The valve member has a control port (92) opening onto the circumferential outer surface thereof and an inner passage (94) communicating the control port with the inlet (96). The solenoid valve is operable to control the fluid pressure substantially proportionally to the axial movement of the armature even in a condition in which a large amount of air bubbles are contained in the automatic transmission fluid.

6 Claims, 7 Drawing Sheets

SOLENOID VALVE FOR AUTOMATIC TRANSMISSION CONTROL SYSTEM

BACKGROUND OF THE INVENTION

1. Field of the Invention

The present invention relates to a solenoid-operated fluid control valve for use in an electronic shift control system of an automotive automatic transmission.

2. Description of the Prior Art

An automatic transmission of automobile includes planetary gear systems disposed between a torque converter and an output shaft. The gears are automatically shifted in response to car speed and engine load by a shift control system having hydraulic actuators adapted to control clutches and bands associated with the planetary gear systems.

Typically, the shift control system is a hydraulic control system designed to control the pressure of an automatic transmission fluid applied to the hydraulic actuators. The traditional hydraulic control system is complicated and includes a 3-way shift valve, a modulator valve responsive to the intake vacuum, a governor responsive to the car speed, and various other hydraulic valves.

More recently, there have been proposed electronic shift control systems having solenoid-operated valves controlled by electronic control units. The advantage of the electronic control systems as compared with the hydraulic systems is that they are less costly and have a wider flexibility in selecting the best gear shift.

In an electronic shift control system, an oil pump in the transmission constantly feeds the pressure line with the automatic transmission fluid under pressure. The solenoid valve signaled by the electronic control unit operates to relieve the line pressure and the modified line pressure is applied to the hydraulic actuators to produce the shift actions. The conventional solenoid valve used in the electronic shift control systems includes a valve member which is movable perpendicular to the plane of the associated valve seat.

The problem encountered in the electronic shift control systems is that, although added with an anti-foam agent, the automatic transmission fluid contains a substantial amount of air bubbles because the fluid is vigorously agitated as it is circulated through the torque converter, gearsets, and multiple-disc clutches of the transmission. It has been found that air bubbles in the automatic transmission fluid give rise to the chattering of the solenoid valve so that the line pressure as controlled by the solenoid valve is considerably deviated from the desired pressure value.

Accordingly, it is an object of the present invention to provide a solenoid valve which is suitable for use in an electronic shift control system of an automotive automatic transmission and which is operable in a stable manner despite the presence of air bubbles in the automatic transmission fluid.

Another problem of the electronic shift control systems is that the automatic transmission fluid is also extremely contaminated by solid foreign materials such as finely divided debris or fragments of metallic materials resulting from wearing of gears and other moving parts as well as finely divided non-metallic debris or particles deriving from the clutch facings and friction linings of the bands.

The ferrous debris or particles born in the fluid are apt to be magnetically attracted to the component parts of the solenoid and would undesirably alter the magnetic path of the solenoid and, hence, the operating property of the solenoid valve. Furthermore, a deposit of sludge consisting of ferrous and non-ferrous materials would alter the travel of the armature and the movable valve member of the solenoid valve.

Therefore, another object of the invention is to provide a solenoid valve for use in an electronic shift control system of an automotive automatic transmission and which is capable of effectively preventing undesirable accumulation of foreign materials.

SUMMARY OF THE INVENTION

According to the invention, the solenoid valve for an electronic shift control system of an automatic transmission includes a body having an axially extending bore defining a cylindrical chamber in which a movable armature of a solenoid device is slidably received. The body has an inlet in communication with a conduit extending from an oil pump and an outlet communicating the chamber with the outside. A cylindrical valve seat is disposed in the body coaxially therewith and defines an inner bore communicating the inlet with the chamber. The solenoid valve further includes a cylindrical valve member slidably and closely received in the valve seat and operatively coupled to the armature. The valve member has a control port opening onto the circumferential outer surface thereof and an inner passage communicating the control port with the inlet. The control port of the valve member is opened and closed in response to the axial movement of the armature.

With this arrangement, the degree of opening of the control port will be increased substantially proportionally to the axial movement of the armature. As no abrupt pressure drop occurs in the conduit during the initial stroke of the valve member, the hydraulic pressure in the conduit is free from pulsation even though a substantial amount of air bubbles are present in the automatic transmission fluid. Therefore, the chattering of the solenoid valve is avoided.

In a preferred embodiment of the invention wherein the armature is made integral with the valve member, the valve seat is delimited at an end thereof directed to the armature by an annular shoulder extending perpendicular to the axis of the valve seat, the armature having an annular shoulder facing the annular shoulder of the valve seat and extending perpendicular to the axis of the armature. The solenoid valve is provided with a stopper engageable with the armature for limiting the travel thereof on its valve closing stroke in such a manner that an axial clearance is held between the annular shoulder of the armature and the annular shoulder of the valve seat as the armature abuts against the stopper.

Due to the presence of the axial clearance between the annular shoulder of the armature and the annular shoulder of the valve seat, the valve member is returned to its fully closed position even in the event that foreign materials have deposited between the annular shoulders. In addition, the annular shoulder of the armature and the annular shoulder of the valve seat are self-cleaned each time the control port is opened to permit the automatic transmission fluid to flow through the chamber to the outlet.

In another embodiment of the invention, the solenoid valve is further provided with a nonmagnetic dust shield for preventing ferrous particles in the automatic transmission fluid from accessing the end face of a pole piece of the solenoid. Due to the provision of the nonmagnetic shield, the magnetic path of the solenoid remains unchanged even though the particle-laden automatic transmission fluid is circulated through the solenoid.

To facilitate fabrication, the valve member may be made separate from the armature and the valve seat may be formed on a valve seat insert which is insert molded in the body.

These features and advantages of the invention, as well as other features and advantages thereof, will become apparent from the following description.

DESCRIPTION OF THE PREFERRED EMBODIMENT

Figure 1:
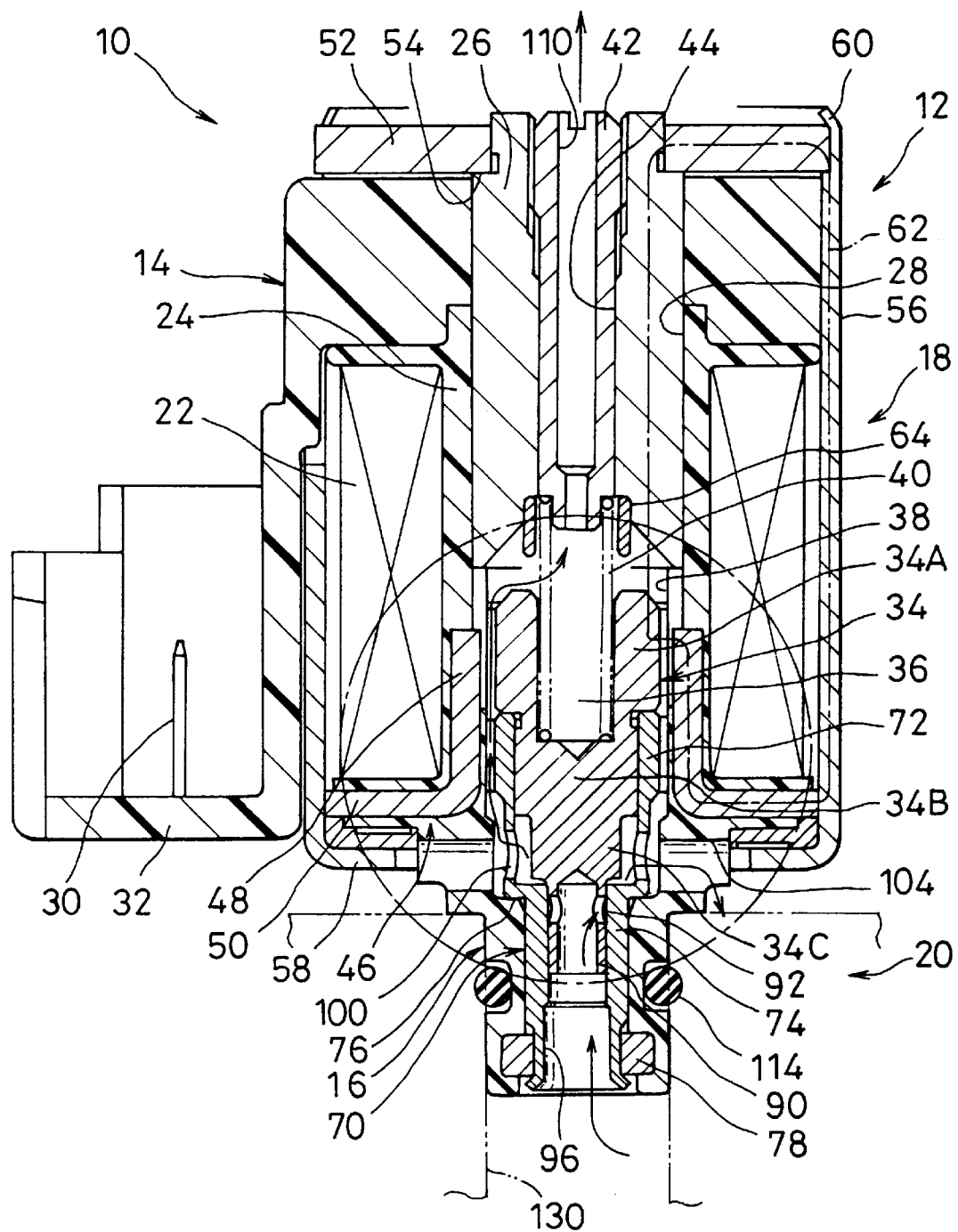
FIG. 1 is a cross-sectional view of the solenoid valve according to the invention.

Referring to FIG. 1, the solenoid valve 10 has a body 12 made of a plastic material. The body 12 has a generally tubular upper section 14 of a relatively large diameter and a generally tubular lower mounting section 16 of a reduced diameter, the upper and lower sections being integrally formed by injection molding. The solenoid valve 10 includes a solenoid device 18 incorporated in the upper body 14 and a valve section 20 incorporated in the lower mounting section 16.

The solenoid device 18 includes a solenoid windings 22 wound around a flanged solenoid bobbin 24 forming part of the upper body 14 and a central magnetic pole piece 26 extending through an upper portion 28 of a stepped axial bore of the upper body 14. The solenoid windings 22 are connected by lead wires, not shown, to connecting pins 30 of an electric socket 32.

The solenoid device 18 further includes a movable armature or plunger 34 which is movably received in an armature chamber 36 defined by a lower part 38 of the axial bore of the upper body 14. The armature 34 is downwardly biased by a return spring 40 having a lower end abutting against the bottom of a cylindrical recess in the armature. The upper end of the spring 40 is adjustably supported by an adjusting screw 42 threadingly engaged in an axial bore 44 of the pole piece 26 to adjust the preload imposed on the spring 40.

The solenoid device 18 also has a yoke member 46 insert molded in the upper body 14 and having an axially extending tubular portion 48 and a radially extending flange portion 50. A disc-shaped top plate 52 made of a ferromagnetic material and having a central opening is placed on an annular shoulder 54 formed on the pole piece 26. The pole piece 26, yoke member 46, solenoid windings 22 and the top plate 52 are surrounded by an outer casing 56 made of a ferromagnetic material and having an inturned flange 58. The top plate 52 is held against the pole piece 26 by inwardly crimping the upper end 60 of the outer casing 56.

When the solenoid windings 22 are energized, a magnetic path will be formed as shown by the dotted line 62 across the pole piece 26, armature 34, yoke member 46, outer casing 56 and top plate 52, to thereby attract the armature 34 toward the pole piece 26 against the bias of the return spring 40.

To ensure that the magnetic attractive force acting on the armature 34 is substantially proportional to the intensity of the electric current supplied to the solenoid windings, an annular stopper 64 made of a non-magnetizable material is provided to limit the upward stroke of the armature 34 in such a manner that the end faces of the pole piece 26 and the armature 34 are axially spaced apart from each other as the armature has fully stroked. The stopper 64 is arranged to surround the spring 40 and is supported by the pole piece 26.

The lower end of the stopper 64 has a rounded cross-section so as to reduce the contact area with the upper end face of the armature 34 to thereby prevent the armature 34 from sticking to the stopper 64 by the viscosity of the automatic transmission fluid during the cold seasons wherein the fluid becomes highly viscous.

Figure 2:
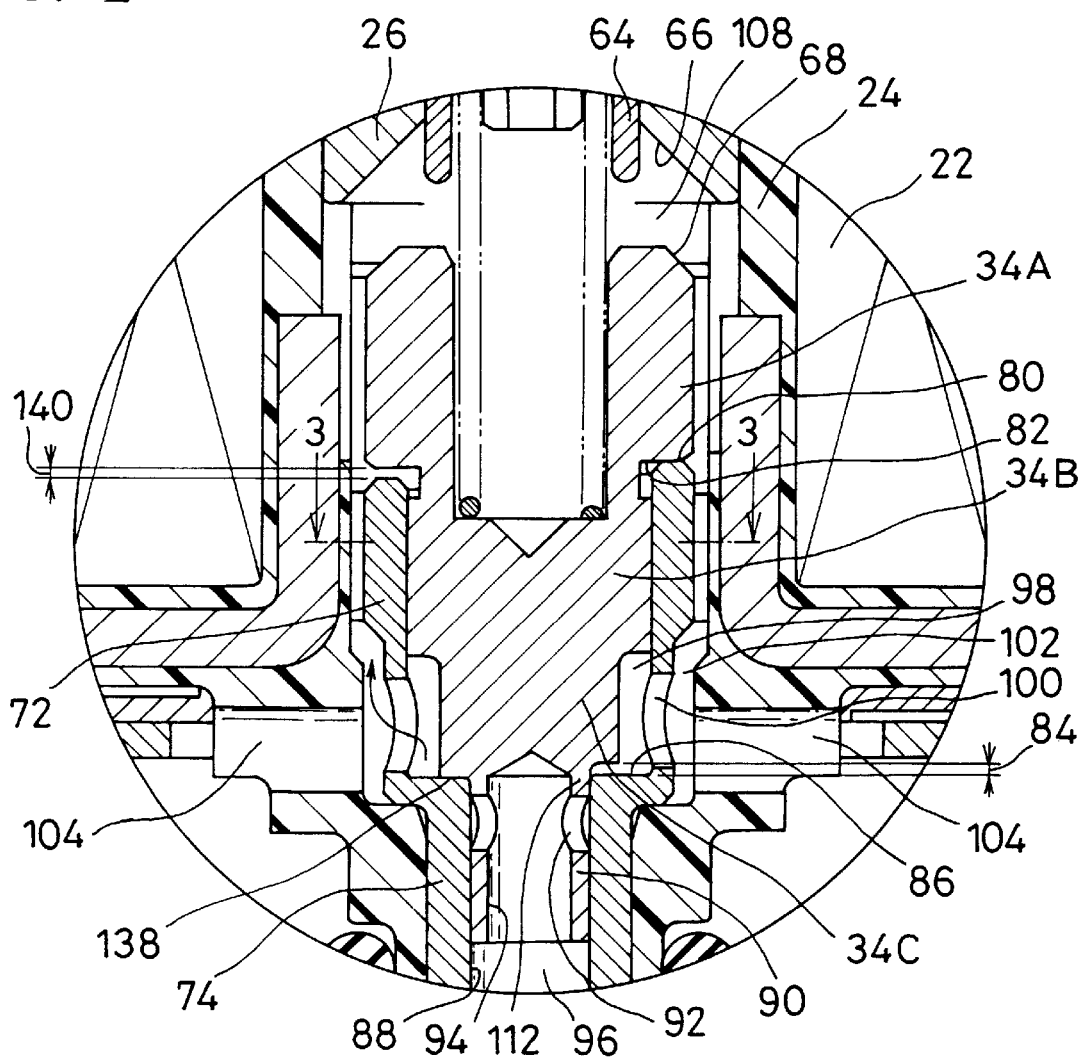
FIG. 2 shows, in the right-hand part thereof with respect to the centerline, an enlarged cross-section of the portion of the valve encircled by the ghost line in FIG. 1, with the left-hand part of FIG. 2 showing a comparative arrangement not according to the invention.

As shown enlarged in the right-hand part of FIG. 2, the pole piece 26 has a downwardly diverging conically tapered end face 66 and the armature 34 has a similar tapered end face 68 facing the end face 66 of the armature. These tapered end faces 66 and 68 also serve to make the magnetic attractive force to vary proportionally to the electric current.

Referring again to FIG. 1, a tubular insert 70 made of a non-magnetizable metallic material is interference fitted within the axial bore of the body 12. The tubular insert 70 is comprised of a large diameter upper part 72 serving as a guide sleeve for the armature 34 and a small diameter lower part 74 serving as a valve seat insert. The tubular insert 70 has an annular shoulder 76 which abuts against an associated annular shoulder formed at the bottom the armature chamber 36. The tubular insert 70 is held in place by crimping the lower end outwardly against a metal ring 78 insert molded within the lower mounting section 16 of the body 12.

As best shown in the right-hand part of FIG. 2, the armature 34 has an upper portion 34A, an intermediate portion 34B of a reduced diameter and a lower portion 34C of a further reduced diameter. The intermediate portion 34B of the armature is slidably guided by the guide sleeve 72 which, in turn, is firmly supported by the upper body 14. The clearance between the inner diameter of the sleeve 72 and the outer diameter of the intermediate portion 34B is small enough to ensure that the armature 34 is axially guided by the guide sleeve 72 without permitting chattering of the armature in the radial direction.

Referring further to the right-hand part of FIG. 2, the guide sleeve 72 has at its top an annular abutment face 80 serving as a stopper for limiting the downward stroke of the armature 34. The stopper 80 cooperates with an annular shoulder 82 formed on the lower end of the upper portion 34A. The stopper 80 and the annular shoulder 82 are so dimensioned and positioned that in the rest position of the armature 34, an axial clearance 84 is held between an annular end face of the lower portion 34C of the armature and an annular shoulder defining the upper edge 86 of the valve seat insert 74.

The valve seat insert 74 has a bore 88 therethrough forming a cylindrical valve seat in which a movable valve member 90 is closely and slidably received. In the illustrated embodiment, the valve member 90 is made integral with the armature 34.

Figure 4A:
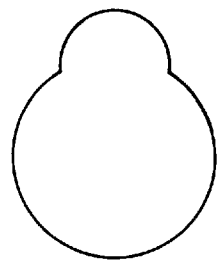
FIGS. 4A and 4B are views showing the modified profile of the control port.
Figure 4B:
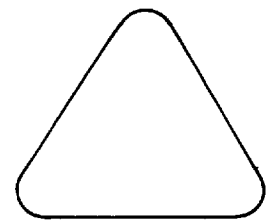

The valve member 90 has a pair of diametrically opposed control ports 92 opening onto the cylindrical outer surface thereof and an axially extending inner passage 94 intersecting with the control ports 92. The control ports 92 may be circular in cross-section. Alternatively, the control ports 92 may have an elongated profile as shown in FIG. 4A or a triangular profile as shown in FIG. 4B.

The axial passage 94 is open downwardly so that it is in communication with an inlet 96 formed contiguous to the valve seat 88.

When the valve member 90 is moved so that the control ports 92 are opened, the inlet 96 will be communicated through the passage 94 and the ports 92 with an annular space 98 (FIG. 2) defined between the lower portion 34C of the armature and the guide sleeve 72. The guide sleeve 72 is provided with a plurality of openings 100 which communicate the annular space 98 with the lower part 102 of the armature chamber 36 which is defined between the guide sleeve 72 and the upper body 14. The lower part 102 of the armature chamber, in turn, is communicated with the outside of the valve 10 by a plurality of radially extending outlets or drain passages 104 formed across the body 14.

Figure 3:
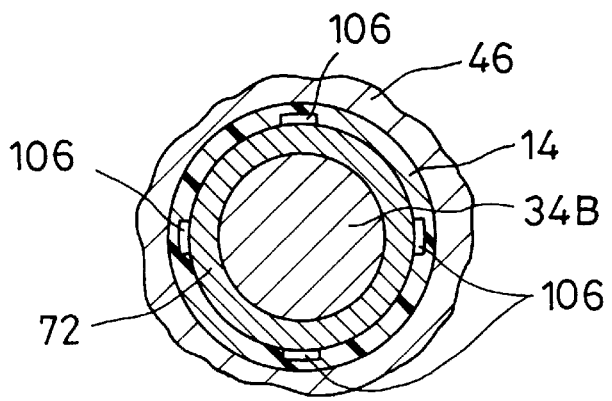
FIG. 3 is a cross-sectional view taken along the line 3—3 of FIG. 2.

As best shown in FIG. 3, a plurality of axial grooves 106 are formed on the inner wall of the upper body 14 so as to also communicate the lower part 102 of the armature chamber 36 with the upper part 108. The upper part 108 of the armature chamber 36 is, in turn, communicated with the outside of the valve 10 via an axial drain passage 110 (FIG. 1) formed through the adjusting screw 42.

The bore 88 forming the valve seat and the outer surface of the valve member 90 are precision machined to form therebetween an extremely small radial clearance in the order, for example, of 60 μm so as to prevent the leakage of the fluid therethrough in the closed position of the valve. In the closed position of the valve, the outer surface of the valve member 90 and the valve seat 88 is preferably overlapped as shown at 112 (FIG. 2) for a predetermined axial length in order to minimize the fluid leakage.

The mounting section 16 of the solenoid valve 10 has a cylindrical outer surface provided with an annular groove in which an O-ring 114 is fitted.

Figure 5:
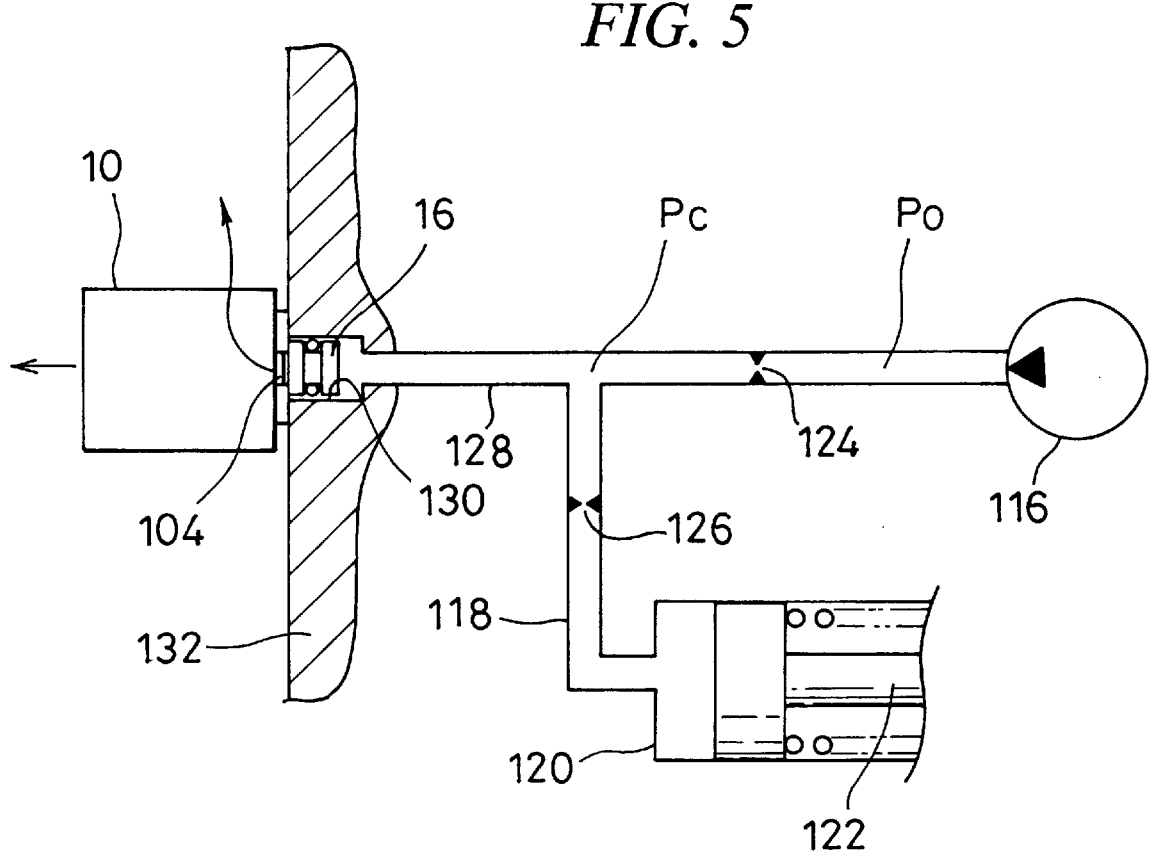
FIG. 5 is a hydraulic diagram of an automatic transmission control system.

Referring to FIG. 5 wherein a hydraulic diagram of an automatic transmission control unit is shown by way of an example, the control unit includes an oil pump 116 for pumping the automatic transmission fluid in an oil pan, not shown, of the automatic transmission. The oil pump 116 is connected by a conduit or pressure line 118 to a hydraulic actuator 120 having an output shaft 122 connected to a clutch or band, not shown, of the automatic transmission. It should be understood that, although only a single hydraulic circuit for the actuator 120 is shown for the purpose of simplicity, the control unit is provided with a hydraulic actuator for each clutch and band of the automatic transmission.

The conduit 118 is provided with a first and second restrictions 124 and 126. The portion of the conduit 118 between the restrictions 124 and 126 is connected to a pressure relief conduit 128 terminating at a mounting bore 130 formed in a body 132 of the unit.

In use, the solenoid valve 10 is installed on the body 132 of the control unit with the mounting section 16 being fluid tightly fitted within the bore 130. The solenoid valve 10 is controlled by an electric control unit, not shown. The oil pump 116 draws the automatic transmission fluid in the oil pan and continuously feeds the conduit 118 with the fluid under an initial pressure $P_o$.

Upon application of an electric current of a controlled intensity to the solenoid coil 22 of the solenoid valve 10, the armature 34 will be magnetically attracted toward the pole piece 26 causing the valve member 90 integral therewith to move on its valve opening stroke to thereby open the control ports 92. The distance of travel of the valve member 90 and, hence, the opening of the control ports 92 will be substantially proportional to the current intensity.

As the control ports 92 are opened, the fluid at the inlet 96 is drained through the openings 100 and the drain passages 104 and is returned to the oil pan. A small amount of fluid is also drained through the axial passage 110 formed through the adjusting screw 42. As a result, the fluid pressure in the portion of the conduit 118 located between the restrictions 124 and 126 is relieved so that a controlled reduced pressure $P_c$ is applied via the restriction 126 to the hydraulic actuator 120 to control the automatic transmission.

Figure 6:
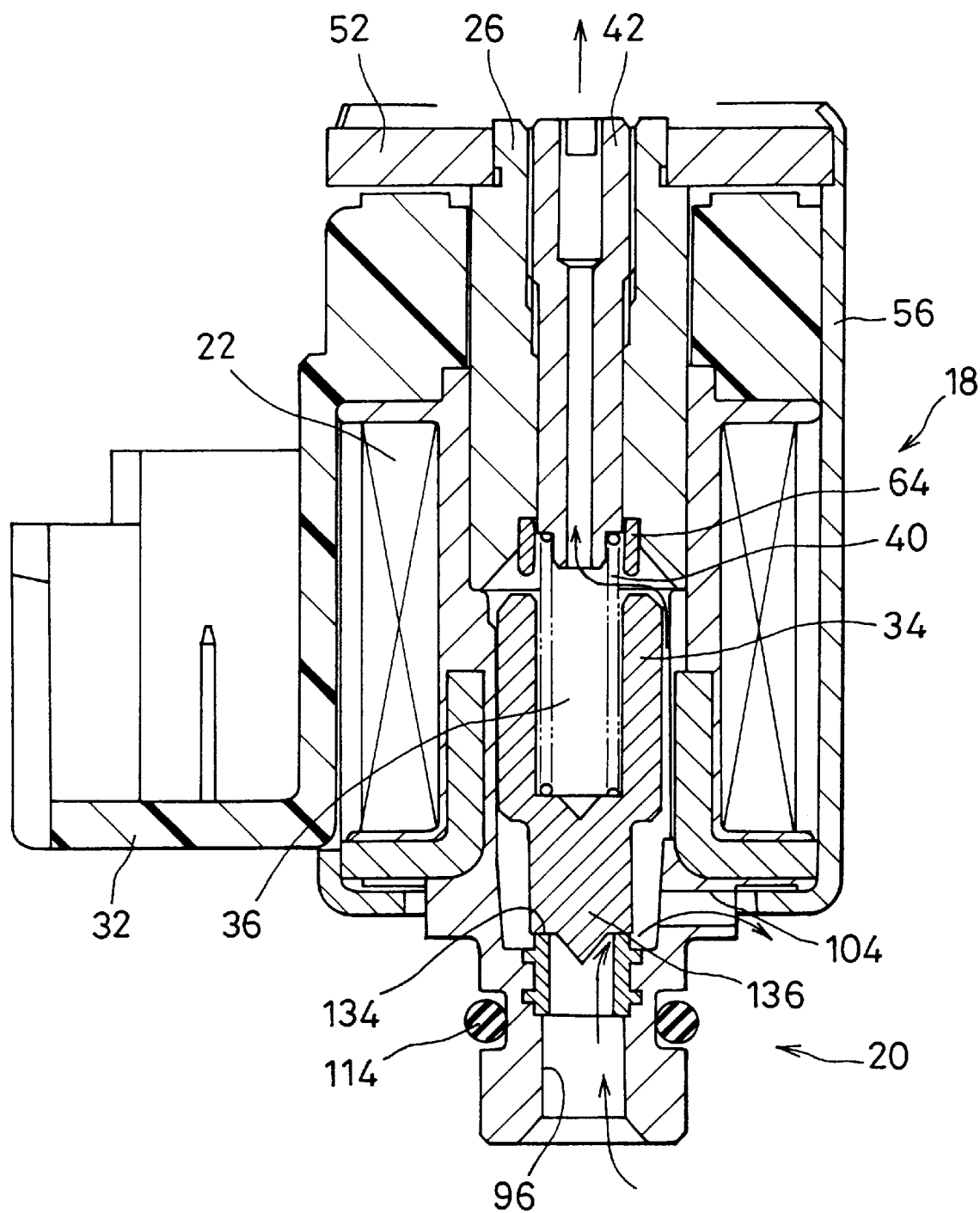
FIG. 6 is a cross-sectional view of the solenoid valve according to the comparative example.

The advantage of the solenoid valve 10 according to the invention will be described in contrast to a solenoid valve according to a comparative example shown in FIG. 6. In FIG. 6, parts and members similar to those shown in FIG. 1 are designated by like reference numerals. Therefore, only the difference will be described.

Referring to FIG. 6, the solenoid valve according to the comparative example has an annular valve seat 134 lying in a plane perpendicular to the axis of the valve. The armature 34 is integrally provided with a valve member 136 having a downwardly directed closure face that cooperates with the valve seat 134.

Figure 7A:
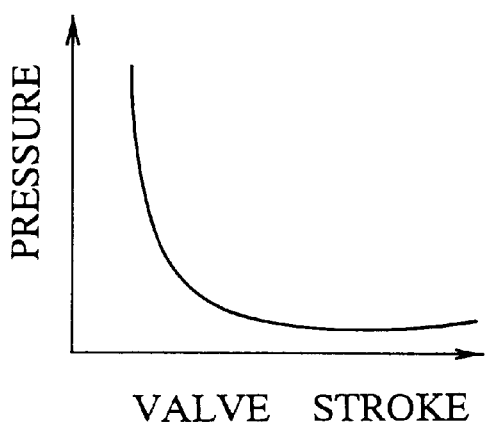
FIGS. 7A and 7C are graphs showing the valve stroke versus pressure curves of the solenoid valve according to the comparative example and the solenoid valve according to the invention, respectively.

When the solenoid valve according to the comparative example is energized, the valve member 136 is moved in the axial direction away from the valve seat 134. This will cause an abrupt pressure drop in the controlled pressure $P_C$ during the initial stroke of the valve member 136 as shown in the graph of FIG. 7A because the rate of pressure relief is exponential for the initial stroke of the valve.

Figure 7B:
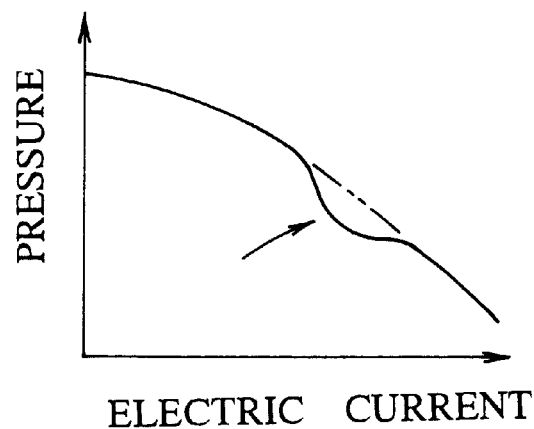
FIGS. 7B and 7D are graphs showing the electric current versus pressure curves of the solenoid valve according to the comparative example and the solenoid valve according to the invention, respectively.

It has been found that, in the event that a large amount of air bubbles are present in the automatic transmission fluid, the abrupt pressure drop in the conduit triggers the controlled pressure to pulsate thereby producing the chattering of the valve member 136. This causes the current versus pressure curve of the solenoid valve to undesirably deviate from the intended property as shown by the arrow in FIG. 7B.

Figure 7C:
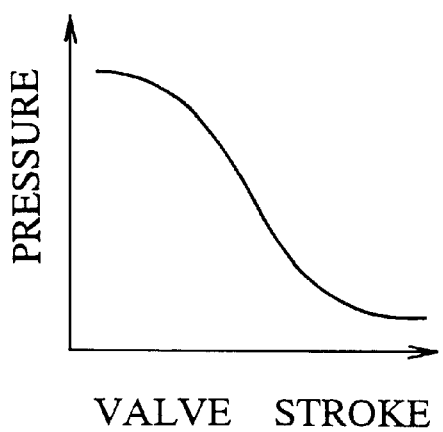
Figure 7D:
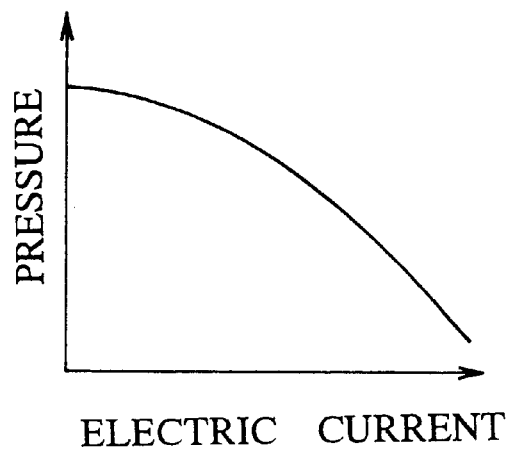

In contrast, in the solenoid valve 10 according to the invention, the degree of opening of the control ports 92 is substantially proportional to the valve member stroke which, in turn, is substantially proportional to the current intensity. As shown in FIG. 7C, the increment of the opening of the ports 92 per unit stroke of the valve member 90 is substantially small as compared with that of the solenoid valve according to the comparative example. Accordingly, occurrence of any abrupt pressure drop in the conduit is avoided so that the fluid pressure applied to the hydraulic actuator is controlled substantially proportionally to the electric current as shown in the graph of FIG. 7D even in the presence of air bubbles.

It may be contemplated that, as shown in the left-hand part of FIG. 2, in the closed position of the valve, the annular end face 138 of the lower portion 34C of the armature abuts against the upper edge 86 of the valve seat insert 74, with an axial clearance 140 being held between the shoulders 80 and 82.

However, the arrangement shown in the right-hand part of FIG. 2 wherein the downward stroke of the armature 34 is limited by the annular shoulder 82 abutting against the shoulder 80 is advantageous over the design shown in the left-hand part of FIG. 2 in that the abutment of the shoulders 80 and 82 is less susceptible to deposition of the sludge of ferrous and non-ferrous materials than the clearance 84 because the shoulders 80 and 82 are situated remote from the main flow of the automatic transmission fluid directed toward the outlets 104. As a result, in the rest position of the solenoid valve, the control ports 92 of the valve member are properly closed so that a stable flow rate is obtained.

In addition, any deposit of foreign materials that has accumulated in the clearance 84 will be washed away by the fluid flow each time the valve is opened, so that the upper edge 86 of the valve seat and the lower end face of the armature are self-cleaned.

During the use of the solenoid valve, ferrous particles contained in the automatic transmission fluid would be magnetically attracted to the conical end face 66 (FIG. 2) of the pole piece 26 as a flow of fluid being drained through the axial passage 110 is in direct contact with the end face 66. Accumulation of ferrous particles on the conical end face of the pole piece may undesirably change the magnetic path and, hence, alter the operating property of the solenoid valve.

Figure 8:
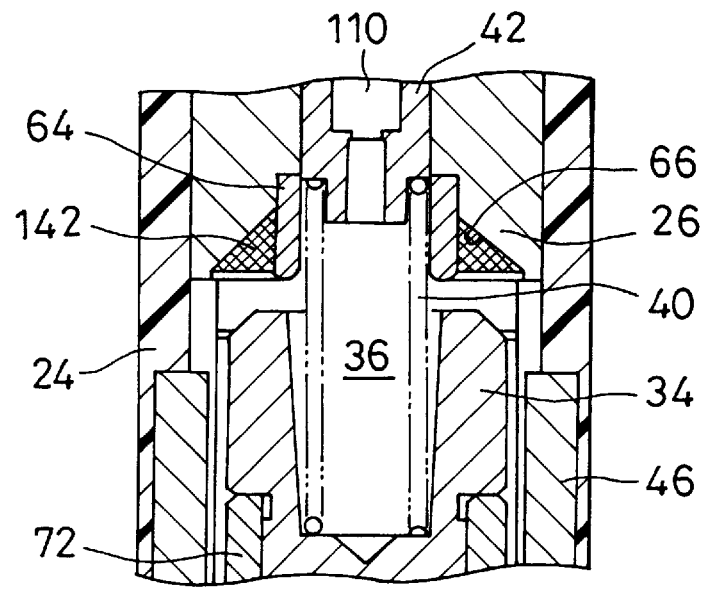
FIGS. 8 and 9 are partial views in cross-section of the solenoid valves according to the modified embodiments.

In FIG. 8, there is shown an arrangement to prevent the conical end face of the pole piece from accumulation of ferrous particles. Parts and members similar to those of the foregoing embodiment are shown by like reference numerals and will not be described.

Referring to FIG. 8, the conical end face 66 of the pole piece is isolated from the armature chamber 36 by an annular shield 142 made of a nonmagnetic material such as stainless steel, copper, brass or plastics. The annular shield 142 may be suitably fixed or adhered to the stopper 64 and configured to fill the annular space between the end face 66 and the outer surface of the stopper 64. Due to the provision of the annular shield 142, the particle-laden automatic transmission fluid is prevented from accessing the pole piece end face so that the magnetic path and the operating property of the solenoid is kept unchanged.

Figure 9:
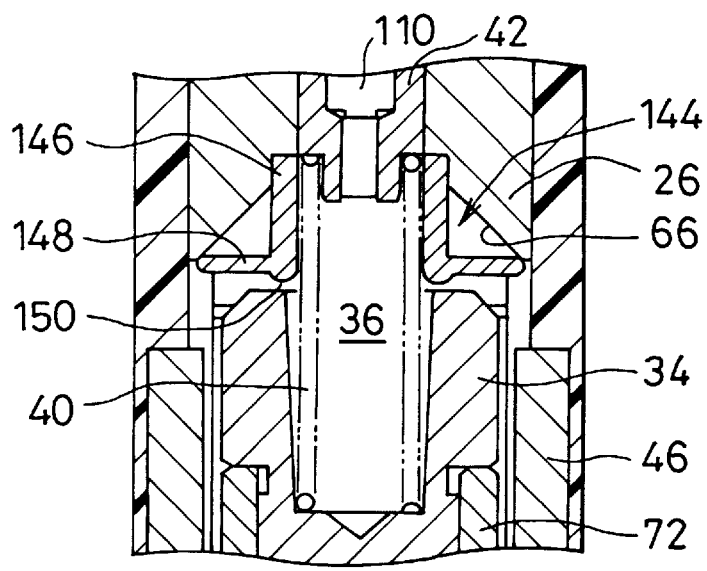
Figure 10:
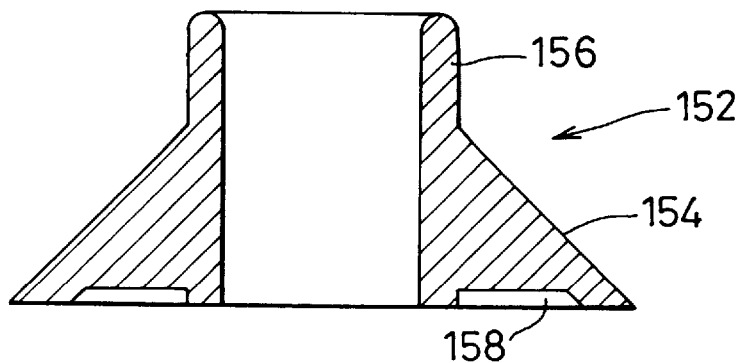
FIG. 10 is a cross-sectional view showing another form of the dust shield.

FIGS. 9 and 10 illustrate modified versions of the nonmagnetic shield. In the embodiment of FIG. 9, the shield 144 is made integral with the stopper and has a tubular portion 146 serving as the stopper and a horizontally extending annular portion 148. The lower end 150 of the tubular portion 146 abuts against the armature to limit its upward stroke.

The dust shield 152 shown in FIG. 10 includes a skirt portion 154 and a tubular stopper portion 156 made integral with the skirt. The dust shield 152 may be suitably fixed to the magnetic pole piece 26. The lower end face of the skirt 154 is provided with an annular recess 158 in order to reduce the contact area with the upper end face of the armature 34. This is advantageous in preventing the armature from sticking to the shield 152 by the viscosity of the automatic transmission fluid during the cold seasons.

Figure 11:
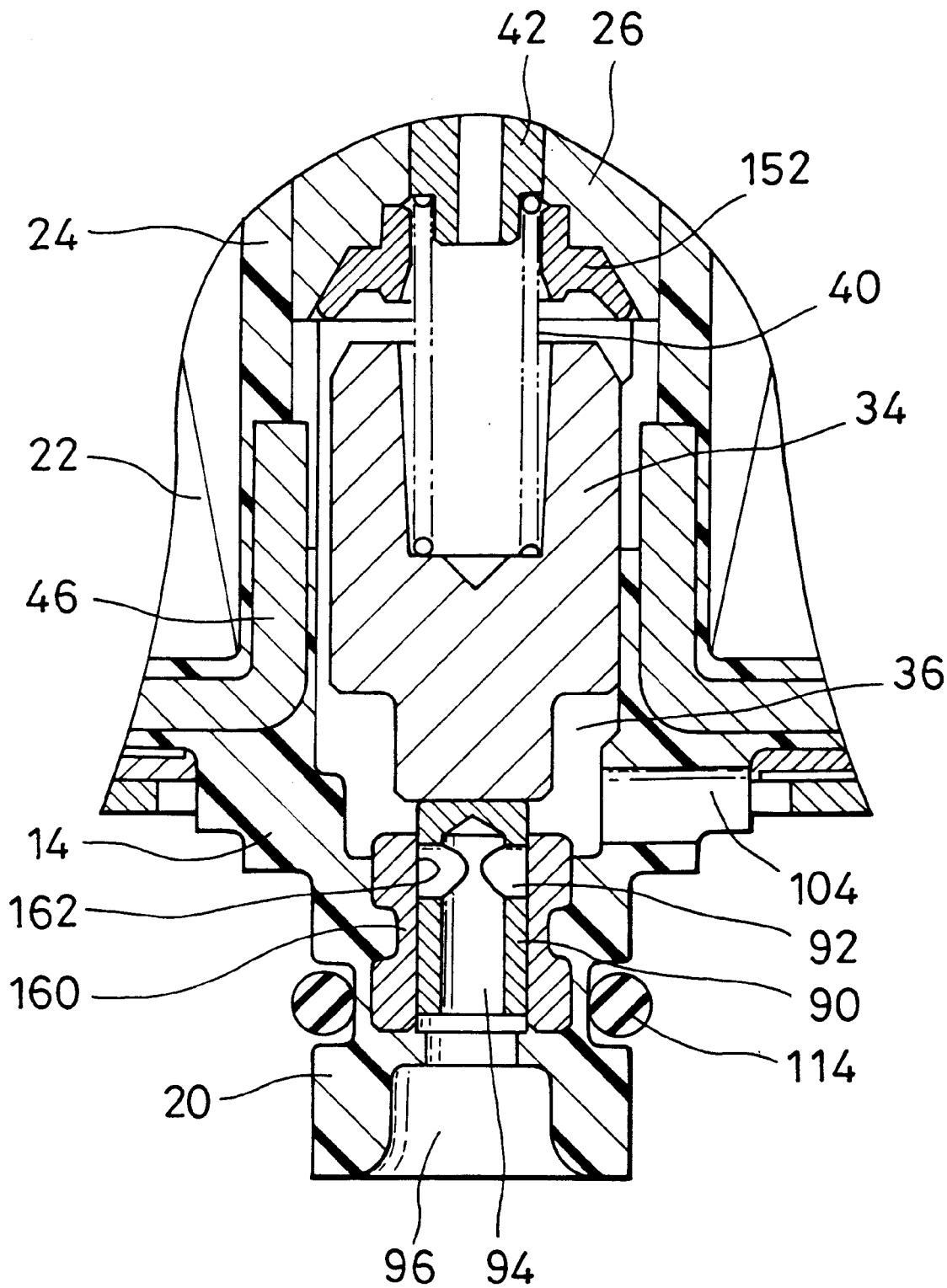
FIG. 11 is a cross-sectional view of the solenoid valve according to another embodiment.

Referring to FIG. 11, there is shown another embodiment of the invention. Likewise, parts and members similar to those of the foregoing embodiments are shown by like reference numerals and will not be described.

To describe only the difference, the movable valve member 90 in this embodiment is made separate from the armature 34 and is adapted to be brought into contact with the armature 34 by the fluid pressure prevailing in the inlet 96. One or both of the upper end face of the valve member 90 and the lower end face of the armature 34 may be made part-spherical to ensure that the valve member 90 follows the movement of the armature 34 even though these two members are not precisely aligned with each other.

A valve seat insert 160 is insert molded within the plastic mass of the lower mounting section 20 of the body 12 and is provided with a cylindrical valve seat 162 in which the valve member 90 is slidably and snugly fitted. The armature 34 is axially guided by the inner wall of the plastic body 14 defining the armature chamber 36 with a small clearance in the order, for example, of 0.1 mm.

The solenoid valve according to this embodiment is easy to manufacture because the armature 34 and the movable valve member 90 are made separate from each other. In particular, the inner diameter of the valve seat 162 and the outer diameter of the valve member 90 may readily be precision machined in such a manner that the radial clearance therebetween is in the order, for example, of 60 μm so as to prevent the leakage of the fluid therethrough in the closed position of the valve. By insert molding the valve seat insert 160 within the plastic body 12, assembly of the solenoid valve is simplified.

While the present invention has been described herein with reference to the specific embodiments thereof, it is contemplated that the present invention is not limited thereby and various changes and modifications may be made therein for those skilled in the art without departing from the scope of the invention. For example, the profile of the control port of the valve member may be modified as required in accordance with desired flow rate and pressure. Similarly, the control port may be in the form of an axially extending slit starting from the upper edge of the valve seat.

What is claimed is:

1. A solenoid-operated fluid control valve for use in an electronic shift control system of an automotive automatic transmission, said control system having a hydraulic actuator connected by a conduit to a fluid pump, said pump being operable to continuously feed said conduit with an automatic transmission fluid under pressure, said fluid control valve being responsive to a control signal to relieve fluid pressure in said conduit to control fluid pressure applied to said actuator, said fluid control valve comprising:

a body having an axially extending bore defining a cylindrical chamber;

a solenoid device having a movable armature slidably received in said chamber;

said body having an inlet which in use is in fluid communication with said conduit and an outlet communicating said chamber with the outside of said body;

a cylindrical valve seat disposed in said body coaxially therewith, said valve seat defining an inner bore communicating said inlet with said chamber: and, a cylindrical valve member slidably and closely received in said valve seat, said valve member having a control port opening onto the circumferential outer surface thereof and an inner passage communicating said control port with said inlet, said armature being operatively coupled to said valve member to open and close said control port in response to the axial movement of said armature whereby the fluid pressure in said conduit is controlled substantially proportionally to the axial movement of said armature, said armature being made integral with said valve member, said valve seat being delimited at an end thereof directed to said armature by an annular shoulder extending perpendicular to the axis of the valve seat, said armature having an annular shoulder facing said annular shoulder of said valve seat and extending perpendicular to the axis of the armature, and said control valve being provided with a stopper engageable with said armature for limiting the travel thereof on its valve closing stroke in such a manner that an axial clearance is held between said annular shoulder of the armature and said annular shoulder of the valve seat as said armature abuts against said stopper.

2. A fluid control valve as defined in claim 1, wherein said armature is slidably guided by a guide sleeve which is closely fitted in said axially extending bore of said body.

3. A solenoid-operated fluid control valve for use in an electronic shift control system of an automotive automatic transmission, said control system having a hydraulic actuator connected by a conduit to a fluid pump, said pump being operable to continuously feed said conduit with an automatic transmission fluid under pressure, said fluid control valve being responsive to a control signal to relieve fluid pressure in said conduit to control fluid pressure applied to said actuator, said fluid control valve comprising:

a body having an axially extending bore defining a cylindrical chamber;

a solenoid device having a movable armature slidably received in said chamber;

said body having an inlet which in use is in fluid communication with said conduit and an outlet communicating said chamber with the outside of said body;

a cylindrical valve seat disposed in said body coaxially therewith, said valve seat defining an inner bore communicating said inlet with said chamber; and, a cylindrical valve member slidably and closely received in said valve seat, said valve member having a control port opening onto the circumferential outer surface thereof and an inner passage communicating said control port with said inlet, said armature being operatively coupled to said valve member to open and close said control port in response to the axial movement of said armature whereby the fluid pressure in said conduit is controlled substantially proportionally to the axial movement of said armature, said solenoid device including a magnetic pole piece aligned with said armature, said pole piece having a conical end face facing said armature, and said control valve further including a nonmagnetic shield for preventing ferrous particles in said automatic transmission fluid from accessing said conical end face of the pole piece.

4. A fluid control valve as defined in claim 3, wherein said nonmagnetic shield is integrally provided with a tubular spacer engageable with said armature for limiting the travel thereof on its valve opening stroke.

5. A solenoid-operated fluid control valve for use in an electronic shift control system of an automotive automatic transmission, said control system having a hydraulic actuator connected by a conduit to a fluid pump, said pump being operable to continuously feed said conduit with an automatic transmission fluid under pressure, said fluid control valve being responsive to a control signal to relieve fluid pressure in said conduit to control fluid pressure applied to said actuator, said fluid control valve comprising:

a body having an axially extending bore defining a cylindrical chamber;

a solenoid device having a movable armature slidably received in said chamber;

said body having an inlet which in use is in fluid communication with said conduit and an outlet communicating said chamber with the outside of said body;

a cylindrical valve seat disposed in said body coaxially therewith, said valve seat defining an inner bore communicating said inlet with said chamber; and, a cylindrical valve member slidably and closely received in said valve seat, said valve member having a control port opening onto the circumferential outer surface thereof and an inner passage communicating said control port with said inlet, said armature being operatively coupled to said valve member to open and close said control port in response to the axial movement of said armature whereby the fluid pressure in said conduit is controlled substantially proportionally to the axial movement of said armature, said valve member being made separate from said armature and brought into contact with said armature by a fluid pressure acting thereon.

6. A fluid control valve as defined in claim 5, wherein said valve seat is formed on a valve seat insert which is insert molded in said body.

\* \* \* \* \*